United States Patent
Czahor

(10) Patent No.: US 8,160,879 B2
(45) Date of Patent: Apr. 17, 2012

(54) SYSTEM AND METHOD FOR ENHANCING SPEECH RECOGNITION ACCURACY

(75) Inventor: Michael Czahor, Bethlehem, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 788 days.

(21) Appl. No.: 12/339,802

(22) Filed: Dec. 19, 2008

(65) Prior Publication Data

US 2010/0161336 A1    Jun. 24, 2010

(51) Int. Cl.
*G10L 15/18*    (2006.01)
(52) U.S. Cl. ........................................................ 704/257
(58) Field of Classification Search ............... 704/257
See application file for complete search history.

(56) References Cited

U.S. PATENT DOCUMENTS

| | | | |
|---|---|---|---|
| 7,302,392 B1 * | 11/2007 | Thenthiruperai et al. | 704/251 |
| 7,574,356 B2 * | 8/2009 | Parthasarathy | 704/231 |
| 7,949,528 B2 * | 5/2011 | Parthasarathy | 704/257 |

* cited by examiner

*Primary Examiner* — Susan McFadden

(57) ABSTRACT

Systems, computer-implemented methods, and computer-readable media for enhancing speech recognition accuracy. The method includes dividing a system dialog turn into segments based on timing of probable user responses, generating a weighted grammar for each segment, exclusively activating the weighted grammar generated for a current segment of the dialog turn during the current segment of the dialog turn, and recognizing user speech received during the current segment using the activated weighted grammar generated for the current segment. The method can further include assigning probability to the weighted grammar based on historical user responses and activating each weighted grammar is based on the assigned probability. Weighted grammars can be generated based on a user profile. A weighted grammar can be generated for two or more segments. Exclusively activating each weighted grammar can include a transition period blending the previously activated grammar and the grammar to be activated.

7 Claims, 4 Drawing Sheets

SYSTEM AND METHOD FOR ENHANCING SPEECH RECOGNITION ACCURACY

BACKGROUND OF THE INVENTION

1. Field of the Invention

The present invention relates to speech recognition and more specifically to increasing accuracy of speech recognition.

2. Introduction

Many businesses use speech recognition applications to save money automating customer interactions. However, speech recognition systems can be unreliable and slow. Speech recognition system can be costly and difficult to maintain. Speech recognition system can also frustrate customers when they are not accurate. The desire to increase speech recognition performance is part of every speech application. Recognition accuracy when completing automatable transactions can dictate business cases and return on investment. Currently in the art, speech recognition systems capture historical caller selections to determine which options are most likely to be selected by callers. Such speech recognition systems create weighted grammars to guide caller responses to the most frequently selected options. For example, a speech menu presents six options to a caller (option a through f). The call history indicates that users select "option a" and "option b" 60% of the time and the remaining four option have an even 10% select rate each. The speech recognizer, as known in the art, builds a speech grammar with all six recognized options, applying weights to the selections to increase recognition probability consistent with selection rate percentages. In this example, the grammar would be better in recognizing "option a" and "option b" since they are weighted higher. The problem with this approach is that grammars for different answers can be incompatible and conflict with each other. A grammar that is tailored to the top two answers may not respond well to user input selecting options other than the top two. Accordingly, what is needed in the art is an improved way to recognize speech in response to multiple prompts.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods, and tangible computer readable-media for enhancing speech recognition accuracy. The method includes dividing a system dialog turn into segments based on timing of probable user responses, generating a weighted grammar for each segment, exclusively activating the weighted grammar generated for a current segment of the dialog turn during the current segment of the dialog turn, and recognizing user speech received during the current segment using the activated weighted grammar generated for the current segment. The method can further include assigning probability to the weighted grammar based on historical user responses and activating each weighted grammar is based on the assigned probability. Weighted grammars can be generated based on a user profile. A weighted grammar can be generated for two or more segments. Exclusively activating each weighted grammar can include a transition period blending the previously activated grammar and the grammar to be activated. The weighted grammar can be based on one or more expected probable user response. The method can optionally include dynamically generating a menu in a natural language dialog based on an event, presenting the dynamically generated menu to a user in a system dialog turn, and generating a weighted grammar for each segment based on the dynamically generated menu.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
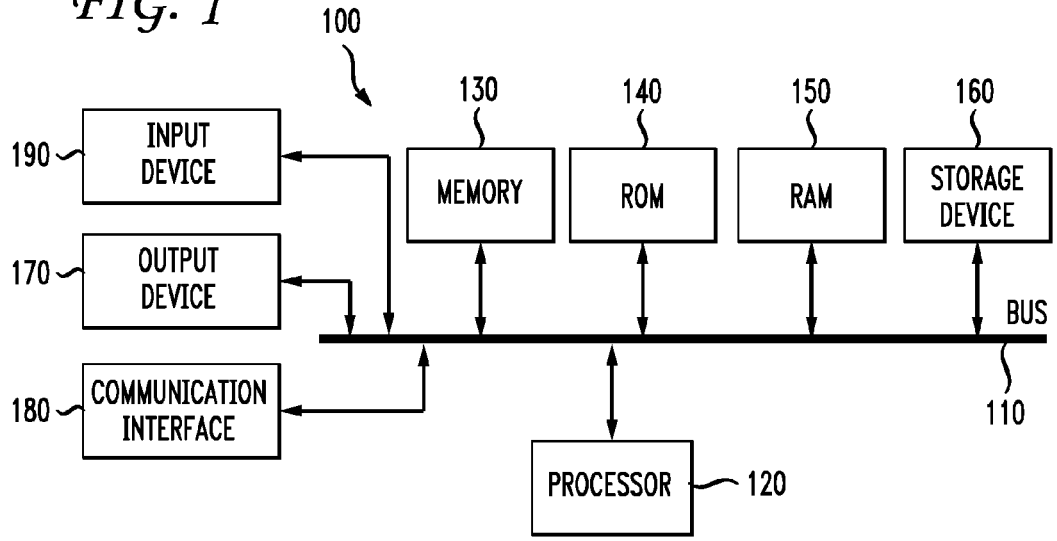
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 2:
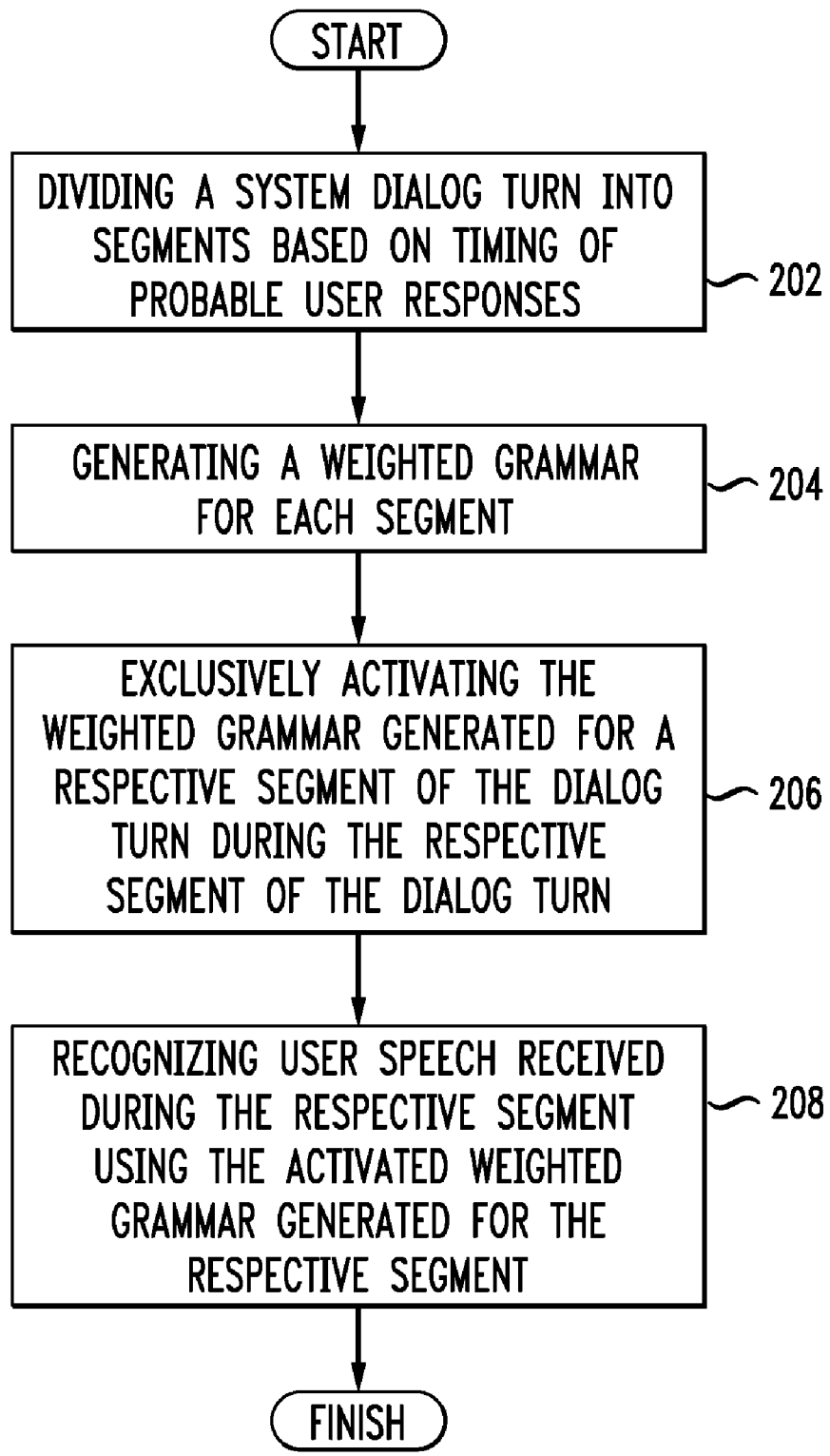
FIG. 2 illustrates an example method embodiment.

Having disclosed some fundamental system components, the disclosure turns to the example method embodiment as shown in FIG. 2. For the sake of simplicity, the example method embodiment is discussed in terms of a system configured to practice the method. The system divides a system dialog turn into segments based on timing of probable user responses (202). The system can also divide a system dialog turn into segments based on the content of the dialog turn, but that is not a requirement. To illustrate this step, consider a natural language menu system that has a menu stating "Say 'Manager' for Bruce Wayne; say 'HR' for Dick Grayson; say 'Customer Service' for Alfred Pennyworth; say 'menu' to go back to the main menu." The system dialog turn is the spoken dialog where the system presents all the options to the user. The system divides the dialog turn based on when it expects user responses. For example, one way to divide the dialog turn is to start immediately following presentation of one option and end as the next option is presented. In the example above, after the word "HR" is said, the segment for "Manager" ends and the segment for "HR" begins. The system can divide dialog turns in this way because users are not expected to respond with an option until they are presented with the option. Once the user hears the option they want, such as "HR", they are likely to say that option. If a user has said nothing by the time the system presents the next option, chances are the user did not want the previously presented option.

The system generates a weighted grammar for each segment (204). The system can generate a weighted grammar optimized to recognize expected probable user responses. For example, for the segment located just after the system presents the option "HR", the system generates a grammar weighted heavily to properly recognize the word "HR" if it is spoken. In cases where users frequently interact with the voice menu system, the system can expect that users will make a selection before any options are presented and generate a weighted grammar based on the most often selected option(s). The system can generate grammars weighted to recognize more than one option.

The system can base the weighted grammar on a user profile. For example, if a certain user calls in and consistently chooses the same option, each generated weighted grammar for that user can include the frequently chosen options. User profiles can include information such as numbers called from, demographic information, account information, frequently selected options based on time of day, time of month, and so forth. The system can generate a weighted grammar for two or more segments. If two segments are sufficiently similar, the system can combine two segments and generate a weighted grammar that is applicable to both segments.

The system can generate a weighted grammar based on one or more expected probable user response. For example, the system can determine based on usage logs that at two responses are the most probable at a given segment in the dialog turn. The weighted grammar at that segment can reflect the two (or more) most probable responses. While the example above was a very closed-ended dialog which only accepts a very small number of predetermined inputs, more open-ended dialogs are possible. One example of a more open-ended dialog is a phone directory for an organization. In that situation, the system can weight the grammar for the most frequently searched-for names. If a user searches for a particular first name, the system can dynamically generate a dialog turn including the search results, segment the dialog turn based on probable user selections, and generate a weighted grammar based on the probable user selections. So, if the user searches for employees named Mary, the system can generate a weighted grammar tailored to recognize each Mary's name as the name is presented (e.g. "Mary Jones in Marketing; Mary V. Ender in Sales, Mary Watts in Research"). The system can also include the most often selected Mary in the weighted grammar.

The system exclusively activates the weighted grammar generated for a respective segment of the dialog turn during the respective segment of the dialog turn (206). Once the system generates a weighted grammar, the system exclusively activates that grammar for the purpose of speech recognition. As the system dialog turn progresses, the system activates a series of weighted grammars. Essentially, each segment of the system dialog turn is its own individually weighted prompt. In some cases where likelihood of one option increases while the likelihood of another option decreases, the system can activate a weighted grammar by including a transition period which blends the previously activated grammar and the grammar to be activated. The system can also assign probability to each weighted grammar based on historical user responses and activate each weighted grammar based on the assigned probability.

Finally, the system recognizes user speech received during the respective segment using the activated weighted grammar generated for the respective segment (208). The method can optionally include dynamically generating a menu in a natural language dialog based on an event (such as a user calling in to a natural language dialog menu system), presenting the dynamically generated menu to a user in a system dialog turn, and generating a weighted grammar for each segment based on the dynamically generated menu. This optional embodiment combines the principles of individual weighted grammars based on probable user input with the principles of dynamically generated menus with dynamically adjustable probable user inputs. The system can predict or extrapolate the types of user input and their associated probabilities in order to adapt to dynamically generated system dialog turns which are subject to constant change.

Figure 3:
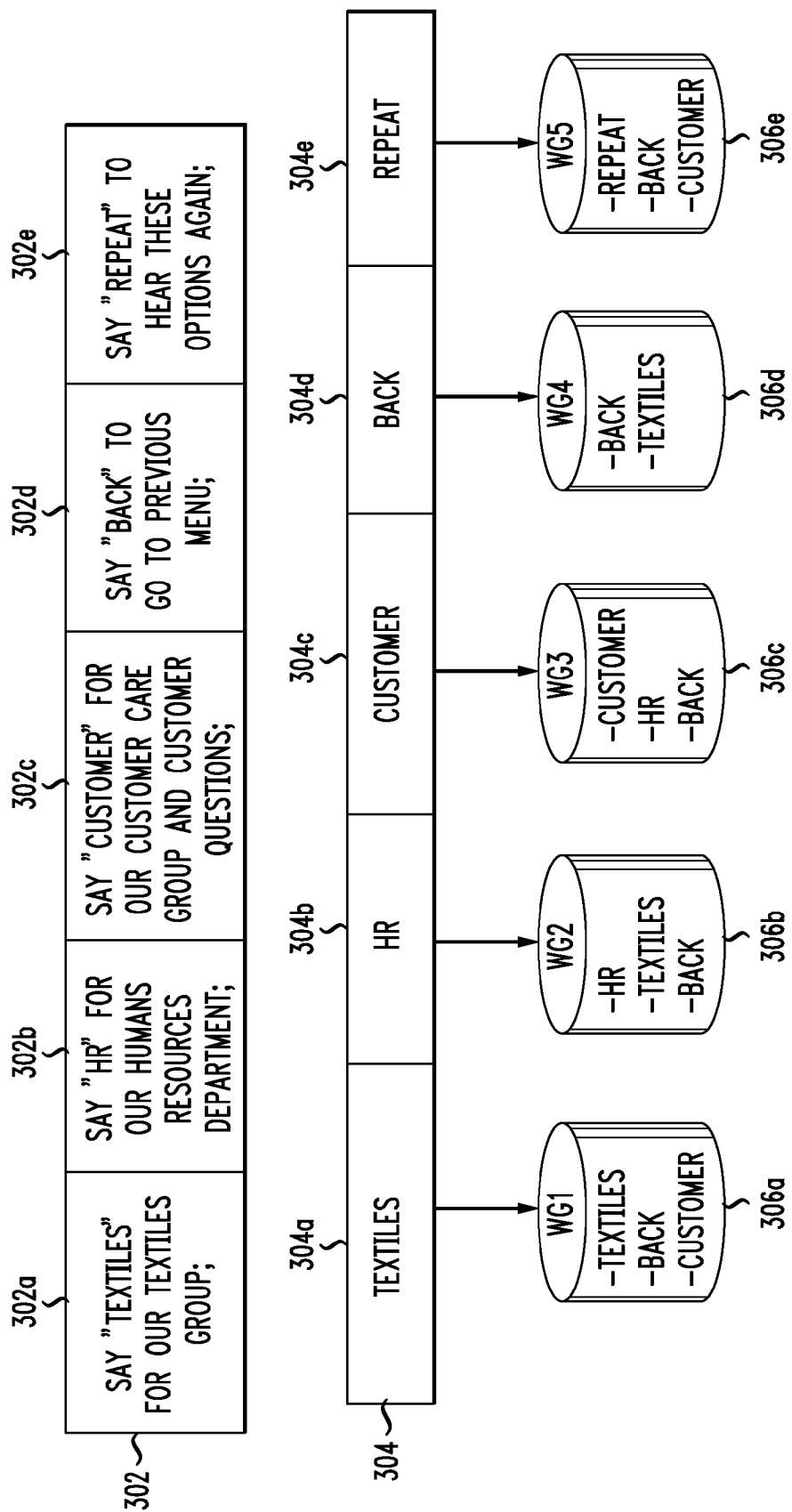
FIG. 3 illustrates a sample division of a system dialog turn.

FIG. 3 illustrates a sample division of a system dialog turn. The system dialog turn 302 is divided into five dialog segments 302a, 302b, 302c, 302d, 302e. Each dialog segment corresponds to presenting a spoken option to a user. The system dialog turn is also divided into five segments 304 corresponding to probable user responses 304a, 304b, 304c, 304d, 304e. The boundaries of the probable user response segments 304 are slightly offset from the dialog boundaries 302 because the beginning of a probable user response does not start until the user hears the presented option. For example, in the dialog "Say 'HR' for our Human Resources department" 302b, the probable user response segment 304b does not start until the user hears the option "HR". Before that point the user will not know that she can say "HR". After that point, the probability that the user will say HR increases dramatically. The system can activate the appropriate weighted grammar at or slightly before presenting "say 'HR' for . . . " to the user. The system can weight each grammar to include more than one probable user response. For example, the first weighted grammar 306a includes "textiles" because it is relevant to the associated system dialog segment, but the weighted grammar includes the words "back" and "customer" because they are the next most often encountered user responses during this segment. The second weighted grammar 306b includes "HR", "textiles", and "back" for the same reason, and so on 306c, 30d, 306e.

Figure 4:
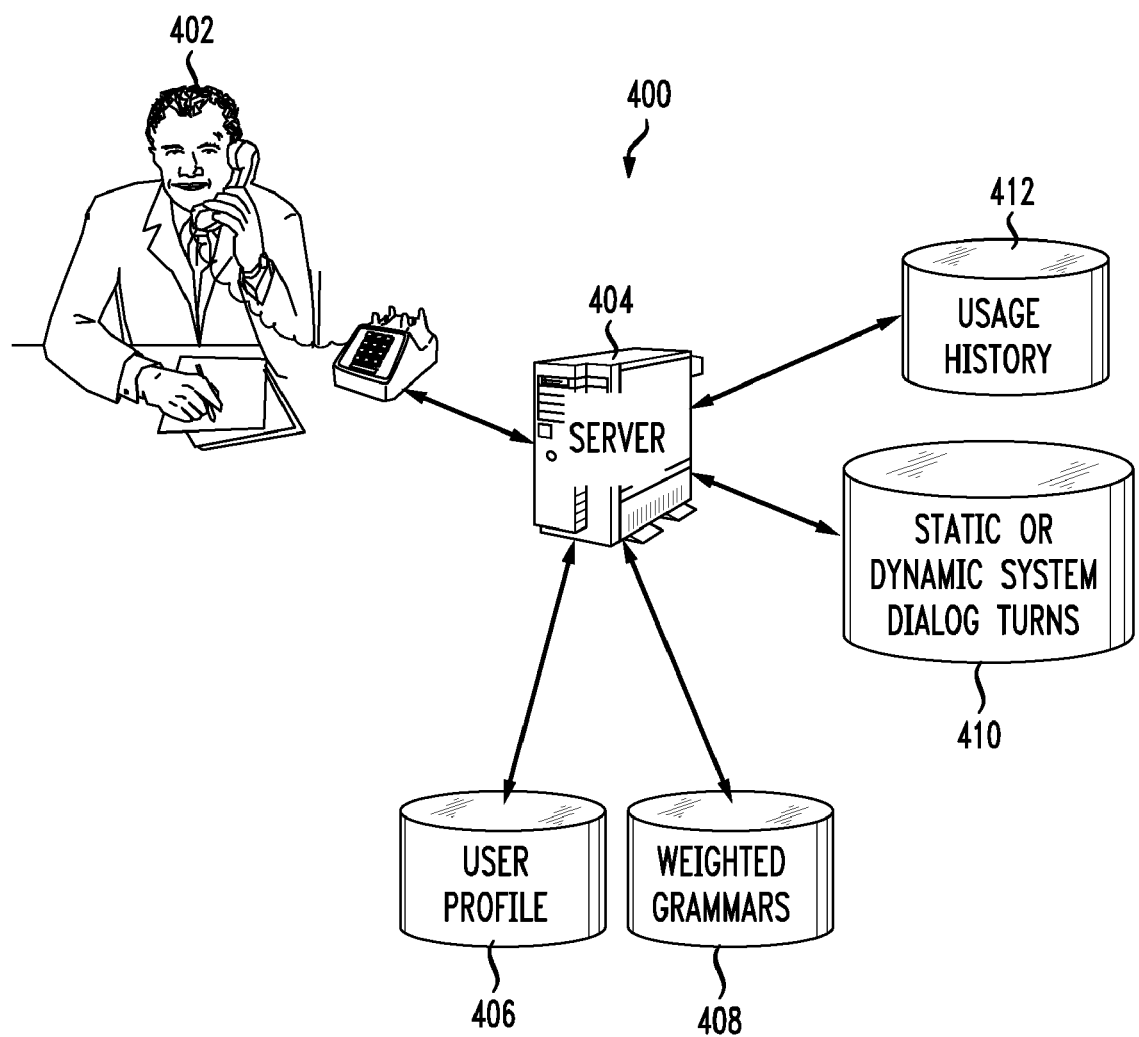
FIG. 4 illustrates a natural language dialog system using weighted grammars.

FIG. 4 illustrates a natural language dialog system using weighted grammars 400. The user 402 calls to a server 404 which engages the user in a natural language dialog. The server 404 can be an individual dedicated server, part of a telephone switch, a cluster of servers, a service provided through cloud computing, and so forth. The user 402 can call using a landline telephone, a cellular phone, Voice over IP (VoIP), or any other suitable voice communications medium. The server 404 can identify the user 402 and associate the user with a user profile 406 storing previous interactions, personal preferences, demographic information, authorization level, and/or other personal information. User profile information can influence the server's decisions and interactions with the user. The server 404 generates a weighted grammar or can select a previously generated weighted grammar 408 to activate over the course of the dialog with the user.

Usage history 412 includes non-user-specific previous interactions. For example, in a given segment, the system can record aggregate statistics indicating that "one" is selected 60% of the time, "two" is selected 30% of the time, and "three" and "four" are each selected 5% of the time. The system can generate a weighted grammar based on probable user responses as recorded by usage history over time. As the usage history 412 grows and reflects actual usage trends, weighted grammars based on the usage history evolve to be more accurate and more likely to correctly recognize spoken responses. Along with a usage history 412, the system can store a database of static or dynamic system dialog turns 410. If a particular system dialog turn occurs over and over, the system can store or cache weighted grammars associated with that dialog turn and its segments.

Once the server 404 generates a weighted grammar, it activates the generated weighted grammar in order to recognize user responses. The user will not speak at each segment. As the user listens and responds at the appropriate segment, the weighted grammar recognizes the speech. Often, a user 402 who calls frequently will become familiar with the menu structure and wish to save time by stating a response before the system presents it to the user. In these cases, the first weighted grammar can include the most common responses from those users who speak before the menu option is presented.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein may be applied to automatic phone menu systems, voice searches online, etc. Those skilled in the art will readily recognize various modifications and changes that may be made to the present invention without following the example embodiments and applications illustrated and described herein, and without departing from the true spirit and scope of the present invention.

I claim:

1. A computer-implemented method of enhancing speech recognition accuracy, the method comprising:
   dividing a system dialog turn into segments based on timing of probable user responses;
   generating a weighted grammar for each segment;
   exclusively activating the weighted grammar generated for a respective segment of the dialog turn during the respective segment of the dialog turn; and
   recognizing user speech received during the respective segment using the activated weighted grammar generated for the respective segment.

2. The computer-implemented method of claim 1, the method further comprising assigning probability to the weighted grammar based on historical user responses and activating the weighted grammar based on the assigned probability.

3. The computer-implemented method of claim 1, wherein weighted grammars are based on a user profile.

4. The computer-implemented method of claim 1, wherein the weighted grammar is generated for two or more contiguous segments.

5. The computer-implemented method of claim 1, wherein exclusively activating each weighted grammar further includes a transition period blending the previously activated grammar and the grammar to be activated.

6. The computer-implemented method of claim 1, wherein the weighted grammar is based on one or more expected probable user response.

7. The computer-implemented method of claim 1, the method further comprising:
   dynamically generating a menu in a natural language dialog based on an event;
   presenting the dynamically generated menu to a user during a system dialog turn; and
   generating a weighted grammar for each segment based on the dynamically generated menu.

* * * * *

UNITED STATES PATENT AND TRADEMARK OFFICE
CERTIFICATE OF CORRECTION

| | | |
|---|---|---|
| PATENT NO. | : 8,160,879 B2 | Page 1 of 1 |
| APPLICATION NO. | : 12/339802 | |
| DATED | : April 17, 2012 | |
| INVENTOR(S) | : Czahor | |

It is certified that error appears in the above-identified patent and that said Letters Patent is hereby corrected as shown below:

In the Claims

Column 8, line 19, claim 3, "weighted grammars are" should be changed to --the weighted grammar is--;

line 24, claim 5, "each weighted grammar" should be changed to --the weighted grammar--;

line 25, claim 5, "the previously activated" should be changed to --a previously activated--;

line 26, claim 5, "the grammar" should be changed to --a grammar--;

line 35, claim 7, "a system dialog turn" should be changed to --the system dialog turn--;

line 36, claim 7, "a weighted grammar" should be changed to --the weighted grammar--.

Signed and Sealed this
Twenty-sixth Day of November, 2013

Margaret A. Focarino
*Commissioner for Patents of the United States Patent and Trademark Office*